United States Patent [19]

Lucas

[11] Patent Number: 5,240,102

[45] Date of Patent: Aug. 31, 1993

[54] TABLE WITH CARRIER BALLS DESIGNED TO ROTATE IN DIRECTIONS EXTENDING ALONG TWO PARALLEL ORTHOGONAL LINES

[75] Inventor: Jean-Jacques Lucas, Prechac, France

[73] Assignee: Bobst SA, Switzerland

[21] Appl. No.: 850,820

[22] Filed: Mar. 13, 1992

[30] Foreign Application Priority Data

Mar. 15, 1991 [FR] France ............................ 91 03543

[51] Int. Cl.$^5$ ............................................. B65G 47/26
[52] U.S. Cl. ................................... 198/456; 198/782; 198/787
[58] Field of Search ............... 98/371, 418.5, 431, 98/436, 456, 468.01, 468.9, 750, 779, 782, 787, 497; 193/35 MD

[56] References Cited

U.S. PATENT DOCUMENTS

| | | |
|---|---|---|
| 2,681,137 | 6/1954 | Davis .................... 198/497 |
| 3,828,917 | 8/1974 | Oestergren . |
| 3,923,150 | 12/1975 | Jager . |
| 4,852,721 | 8/1989 | Stille .................... 198/782 |
| 5,000,305 | 3/1991 | Lucas . |
| 5,147,032 | 9/1992 | Rombouts ............ 198/787 |
| 5,160,017 | 11/1992 | Goodman et al. .... 198/787 |

FOREIGN PATENT DOCUMENTS

| | | |
|---|---|---|
| 0369133 | 5/1990 | European Pat. Off. . |
| 2167878 | 8/1973 | France . |
| 2224379 | 10/1974 | France . |
| 2174966 | 11/1986 | United Kingdom . |
| WO-A-89/07081 | 8/1989 | World Int. Prop. O. . |

Primary Examiner—Joseph E. Valenza
Attorney, Agent, or Firm—Hill, Steadman & Simpson

[57] ABSTRACT

A table for orthogonally sorting flat workpieces comprising a tray with freely rotatable carrier balls protruding from both surfaces of the tray, an arrangement engaging the balls to support the balls and to rotate them in either direction along a first line of motion, this arrangement being either a continuously moving belt or a plurality of parallel positioned rollers. The table also includes an arrangement for obtaining relative movement between the belt or parallel rollers and the tray to cause a rotation of the balls along a second line extending perpendicular to the first line.

9 Claims, 10 Drawing Sheets

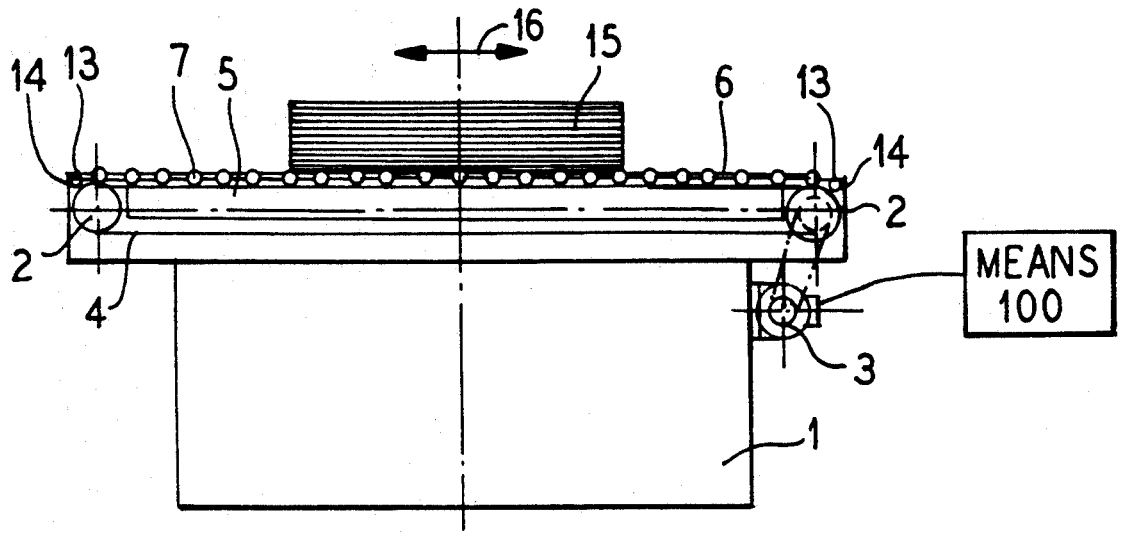
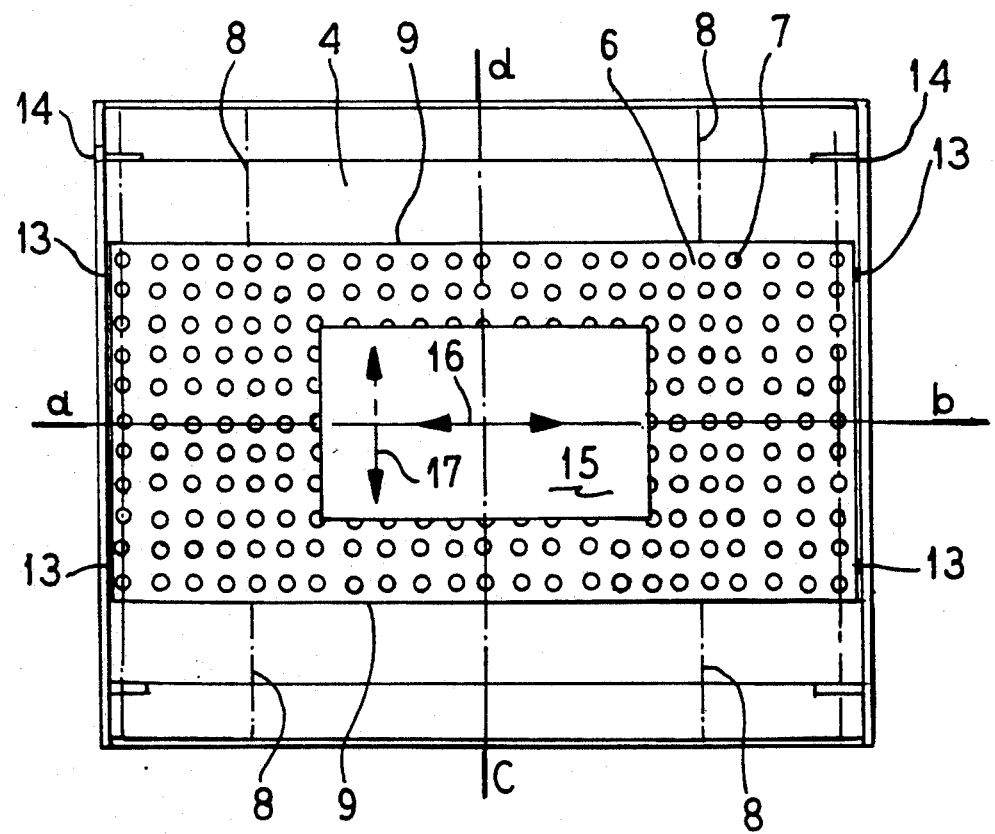

TABLE WITH CARRIER BALLS DESIGNED TO ROTATE IN DIRECTIONS EXTENDING ALONG TWO PARALLEL ORTHOGONAL LINES

BACKGROUND OF THE INVENTION

The present invention is directed to a table for orthogonal sorting of flat workpieces, said table having motor-driven crosswise moving carrier balls.

Industrial processes frequently require workpieces to be orthogonally shifted from one point to another for instance between a production machine and a palletizing device. Such transfers are habitually effected by means of a web conveyor, motor-driven rollers and the like.

As a result such workpieces have a shape of a parallelepiped. For instance, there are batches of cardboard sheets or plates which move in a procession one behind the other.

Such a process is customary even though it fails to resolve the problem of grouping the batches if at the end of the course, it is necessary to assemble the workpieces parallelly and longitudinally against one another in order to make a layer of several batches.

SUMMARY OF THE INVENTION

The purpose or object of the present invention is to provide a machine which ensures, especially a sideways shifting either to the left or to the right of workpieces arriving upstream and in a continuous way with-adjustment sideways shifting, i.e., by combining the lengthwise and sidewise shifts and in a more general ways the movement of the workpiece in any direction with regard to the direction of conveyance of the workpiece in a machine with a view of having the latter workpieces taken over by a device ensuring subsequent processing with the requested position.

To this end, the invention has a purpose to provide a table for the orthogonally sorting of flat workpieces, said table comprising a horizontal tray with freely rotating carrier balls being arranged within said tray so as to protrude beyond or above both the upper and lower surfaces of said tray; support means arranged underneath the tray for supporting said carrier balls; primary means for imparting to the carrier balls at their contact with said support means an initial rotary motion in a direction along a horizontal first line; secondary means for imparting to the carrier balls at their contact points a second rotary motion in a second direction along a horizontal second line extending perpendicular to said first line; means for controlling and checking the application and intensity of the rotary motion of said primary and secondary means so as to impart to the carrier balls at their contact points a rotary motion resulting from a variable amplitude in any direction of the reference plane defined by said first and second lines; means for carrying the workpiece onto the balls of the tray for processing; and means for collecting workpieces at an outlet of the tray after processing.

According to the first embodiment of using the ball tray as specified by the invention, said means for supporting the carrier balls consist of an endless belt, itself supported by appropriate support means, whereby the first primary means for imparting to the carrier balls consist in rotating said endless belt, the said upper part of this belt is in contact with the carrier balls and the secondary means includes means appropriate for generating a relative movement between the tray and belt at right angles to the movement of said belt. The means for generating such a relative movement between the tray and the belt consist for instance of means for shifting the tray on the belt which moves on rollers about an axis of rotation extending perpendicular to the movement of the belt due to the primary means. The means for generating the relative movement also includes means for guiding the tray so that it moves in this direction perpendicular to the motion of the belt.

It would be advantageous to make provisions for cleaning the belt with brushes, scrapers or other appropriate devices in order to remove dust and cardboard offals or wastes.

According to a second embodiment of using the device of the present invention, the carrier balls support means consist of horizontal rollers arranged side by side and supporting the carrier balls of the tray, said primary means for imparting motion to the carrier balls include means for rotating said rollers with a synchronized rotation and the secondary means for imparting to the carrier balls said secondary rotary motion in a second direction consisting of means for shifting the tray parallel to the axis of said elongated rollers.

Depending on the alternative realization of this second mode, the supporting and driving rollers of the carrier balls are arranged in independent controllable groups with each group comprising of a certain number of rollers covering the whole width of the tray.

Every supporting and driving roller may also consist of various portions of rollers arranged side by side and controlled independently to provide several parallel and adjacent portions with synchronized controls so as to make up the tray juxtaposed sections within which the carrier balls are rotated in a direction wanted in order to impart to the workpiece placed on the table any shift or rotation or else a combination of the two motions with a view to the correct positioning of the workpiece within a predetermined assembly of identical or non-identical workpieces.

Other features and advantages of the present invention will be readily apparent from the following description of the preferred embodiments, the drawings and claims.

BRIEF DESCRIPTION OF THE DRAWINGS

FIG. 1 is a top plan view of a table in accordance with the present invention;

FIG. 2 is a front view of the table of FIG. 1;

DESCRIPTION OF THE PREFERRED EMBODIMENT

Figure 3:
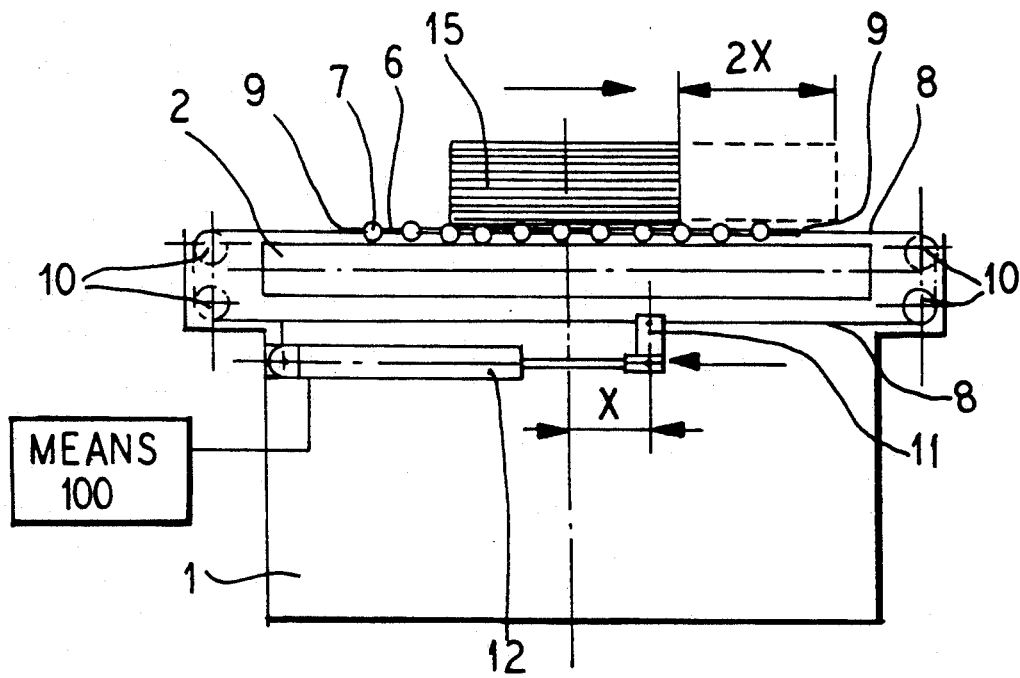
FIG. 3 is an end view taken from the left-hand side of the table showing in FIG. 2.

The principles of the present invention are particularly useful when incorporated into a ball table illustrated in FIGS. 1, 2 and 3. The ball table has a frame 1 for supporting the rollers 2 which are driven by a motor 3 and support an elastomer coated horizontal endless belt 4 which runs along a direction of a line a-b (FIG. 1). A lower surface of the upper run of the belt rest on a horizontal support 5 which is held by the frame 1. The upper surface of the upper run of the belt 4 serves as a resting device for a horizontal rigid tray 6 provided with holes in which are arranged in a known manner, the carrier balls 7 of a hard material which balls rotating freely and are protruding from both the upper and lower surfaces of the tray 6. The carrier balls 7 are arranged at equal distance according to the perpendicular alignment which corresponds to the length direction or line a-b in FIG. 1 and a width direction or line c-d of the tray 6 respectively.

The tray 6 is moved in the direction along line c-d which is at right angles and perpendicular to the motion of the belt 4 by chains 8, which are mounted on lengthwise or the long edges 9 of the tray 6. The chain run along a plurality of idler pinions 10 so that a portion of the chains run above the belt 4 and a portion runs below the belt. To move or rotate the chains on their pinions 10, an attachment 11 (FIG. 3) is fitted on the end of a rod of a jack 12 which will shift the chains and the tray along a line extending parallel to the line c-d as indicated by the double arrow 17 which extends at right angles or perpendicular to the direction on a line indicated by the arrow 16 along which the belt 4 is moved.

The width of the tray 6 in the direction c-d is shorter than the width of the belt 4 and the tray is supported as well as guided along its ends by rollers 13 which travel within gliding rails or channel members 14 mounted on the frame 11 (see FIG. 2). The purpose of the guiding rails 14 is to hold the tray 6 at a sufficient distance above the belt 4 so as to enable the carrier balls 7 to protrude from the tray both on the upper and lower surfaces and the carrier balls resting on the belt 4 on account of their proper weight. The tray 6, the carrier balls 7, and the belt are all chosen of materials on the basis of the material resistance to rubbing. Alternately the tray 6 can be provided with interchangeable bushings to be used for guiding the carrier balls 7 as disclosed in in U.S. Pat. No. 5,000,305.

The belt 4 can be shifted to move in either direction along the arrow 16 by changing the direction of rotation of the motor 3. In a similar manner, the tray 6 can be shifted to move in either direction along the line 17, which is perpendicular to the direction of line 16 based on the action of the jack 12. It should also be noted, that each of these movements can have their speeds adjusted based on the rate of rotation of the motor 3 and/or the rate of advance or movement of the jack 12.

It should be noted that with regard to shifting the tray 6, a shift X illustrated in FIG. 3 of the tray due to the movement of the jack will cause a shift 2X of the workpiece 15 lying on tray 6 on account of the multiplication created by the rotation of the carrier balls and the relation of the carrier balls size to that of the tray 6.

The workpieces 15 are understood to be flat objects, for example, a stack of flat objects linked together or not. For instance, the workpieces 15 can be cardboard blanks or else objects with a plane front side.

The device operates in the following manner. With the belt 4 operating, the workpiece 15 arriving lengthwise along the direction of line a-b either from the right side or the left side will cross the ball table in a straight line provided the ball tray 6 is at a standstill. There is no necessity for the workpiece to be positioned on the table axis. Any straight motion in the direction a-b is possible in the area where the workpiece 15 is actually carried by the carrier balls 7. A workpiece 15 carried into the area of the ball table owing to the motion of the belt 4 can be shifted crosswise to one side or the other by having the ball tray 6 move to one or the other side along the direction of line c-d as illustrated by the double arrow 17. The sideways shift may take place with the belt 4 either at standstill or moving. Owing to the combined motion of the belt 4 and the tray 6, the workpiece 15 will be compelled to move obliquely, though in parallelism with the edges 9 of the tray 6. With this action, the belt 4 will impart to each carrier ball 7 a rotational motion moving the workpiece 15 along the direction a-b as well as a rotary motion moving the workpiece in a direction along the line c-d so that the carrier ball 7 will be subjected to a move resulting from the two rotational motions imparted by the belt 4 to each carrier ball 7 at its contact point. The resulting rotary motion for each carrier ball 7 is identical both in each direction and with the same amount since the workpiece 15 is subjected to a shift on the table towards the one or the other edges 9 of the tray 6.

Depending on the amplitude of the rotary motion imparted on the carrier balls 7, the workpiece will allow to be moved forward in any direction of the referential system defined by the two horizontal perpendicular directions along the lines of a-b and c-d. If the belt 4 operates alone, the workpiece will travel as indicated above either along the line a-b either towards the end a or the end b depending on which way the belt is moving. If the jack 12 is operated alone and the belt is stationary, then the workpiece will travel in either direction along the line c-d depending on which way the tray is being shifted.

The combined motions of the belt 4 and the tray 6 allows imparting of any orientation to the moving workpiece 15 on the table. It is understood that the table is advantageously provided with means 100 (FIGS. 1 and 3) for programming the direction of motion and speed of the belt 4 and of the tray 6, and programming the parameters for the desired position to be taken up by the workpiece. Thus, the means 100 will control and check the application and amplitude of the motions imparted to the balls 7.

The tray is moreover provided with baffle plates (not represented in FIGS. 1-3) which are arranged to extend parallel to the edges of the tray 6 and are mounted so as to allow the free passage of the tray therebeneath. The sideways position of these plates is determined by the device to ensure the delivery of the workpiece at the outlet of the table.

Figure 5:
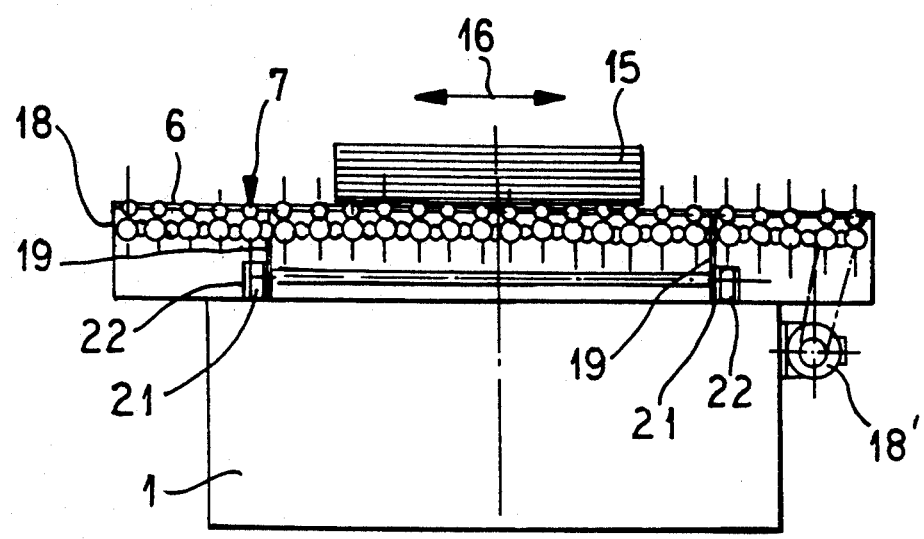
FIG. 5 is a front view of the table of FIG. 4.
Figure 4:
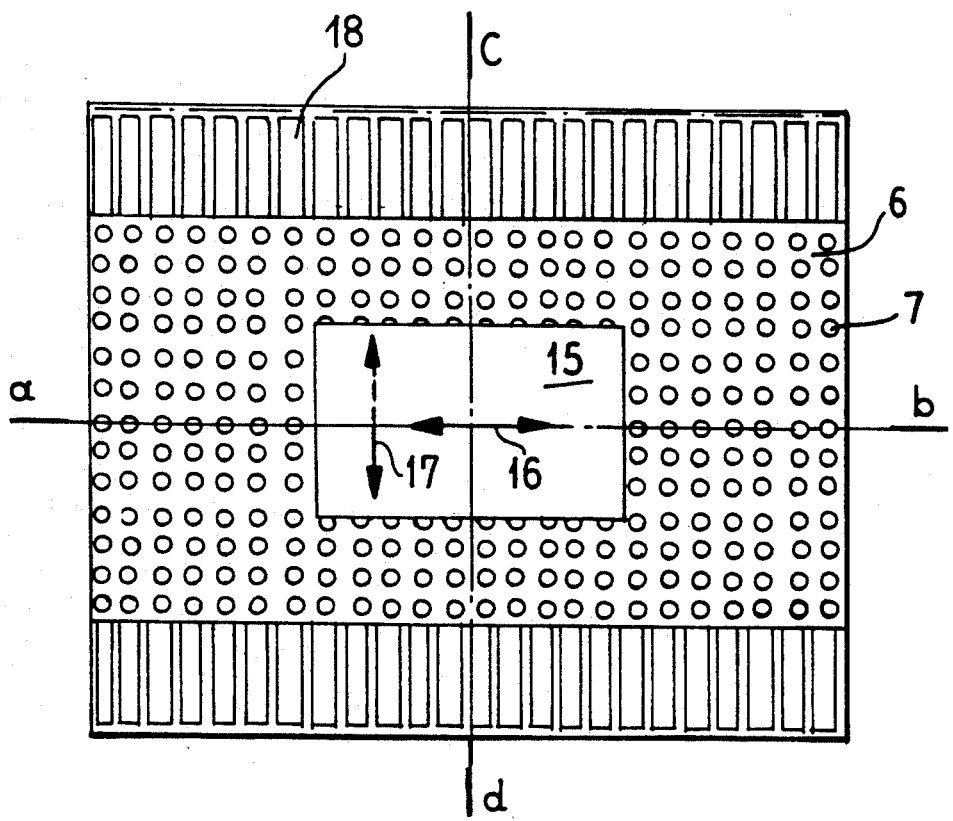
FIG. 4 is a top plan view of an embodiment of a table in accordance with the present invention.
Figure 6:
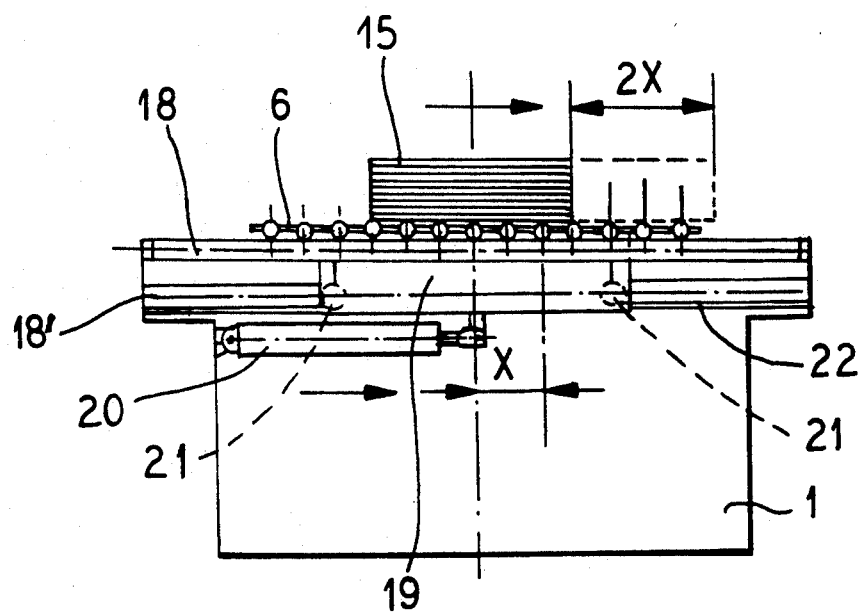
FIG. 6 is an end view taken from the left-hand side of the table shown in FIG. 5.
Figure 8:
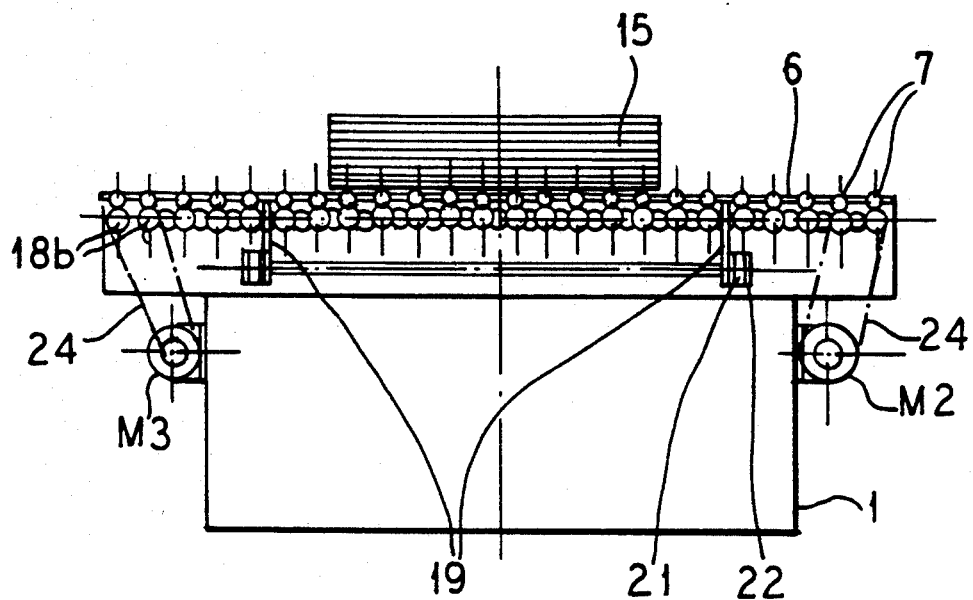
FIG. 8 is a front view of the table shown in FIG. 7.

An alternate embodiment of the table is illustrated in FIGS. 4-6. In this embodiment the tray 6 is similar to that of FIGS. 1-3 with the difference that the carrier balls 7 rest on motor-driven rollers 18 which are arranged to extend side by side parallel to each other. The rollers 18 are synchronously driven by a motor 18' in one or the other direction with an adjustable speed and the rollers 18 impart to the carrier balls 7 at their contact points a rotary motion in the same direction as the one imparted by the belt 4 of the table shown in the embodiment of FIGS. 1-3, i.e., as indicated by the double arrow 16 in FIG. 4.

The motion of the tray is simplified since it may take place under the action of a vertical plate 19, see FIGS. 5 and 6, passing between two rollers 18. These plates 19 hold the tray 6 at an appropriate height and guide and drive the tray 6 owing to the action of a jack 20 mounted on the frame 1 and having a piston rod connected to one of the plates 19 by appropriate links. The assembly is guided by a system of rollers 21 which are attached to the plates 19 and run in channels or gliding bars 22 as illustrated in FIG. 5.

The operating principle of this device is the same as the one for the device in FIGS. 1-3. In the course of the shift effected by the tray 6 in the direction c-d, every row of carrier balls 7 arranged opposite the respective rollers 18 will move along the roller.

The roller 18 might have a elastomeric coating which enables thereby a better ball adherence. Attention is to be drawn particularly to the fact that in comparison with the embodiment of FIGS. 1-3, the embodiment of FIGS. 4-6 involves among other things the advantage of ensuring better removal of dust and cardboard offals. The result thereof is a better operation of the device on account of the fact that the device ensures the transmission of the rotary motion onto the carrier balls will not accumulate dirt or at least not as rapidly as the device of FIGS. 1-3.

Figure 10:
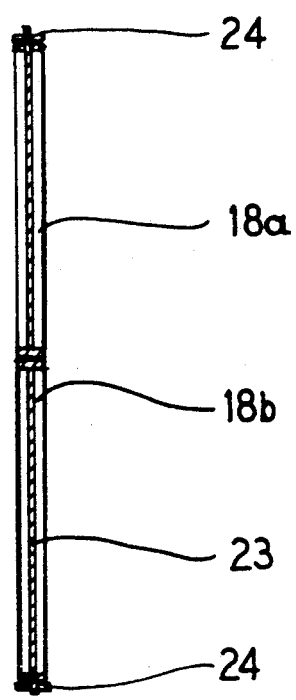
FIG. 10 is an axial cross-sectional view of the supporting and driving rollers of the table shown in the modification of FIGS. 7-9.

A modification of the device of FIGS. 4-6 is illustrated in FIGS. 7-10. In this modification the supporting drive rollers 18 are subdivided into four sections S1-S4. Indeed every roller supporting and driving the carrier balls 7 actually consist of two small rollers 18a and 18b as best illustrated in FIG. 10. These two rollers 18a and 18b are mounted on a common axle 23 but are driven independently.

Every roller 18a and 18b is driven by a system of pinions and chains 24 which are driven by motors or else by tangential belts which are driven by a motor itself fitted on the frame 1. Every section S1 to S4 is connected to a respective motor M1 to M4 which drives all the rollers of one section synchronously. The rollers 18a and 18b are approached to each other to such a point as to have their generating lines form practically a continuous track so as to prevent jerks when the carrier balls 7 run from one roller 18a to the adjacent roller 18b and vice-versa.

An automatic device is envisaged for controlling or programming the operation of the motors M1-M4 with a view to ensure the required shifting of the workpiece on the tray 6. If the four motors M1 to M4 run with the same speed and in the same direction, all the carrier balls 7 of the tray will be driven in the same direction as with the belt 4 or the rollers 18, if the tray 6 is at a standstill. However, the motors M1 to M4 are at a standstill with the tray being shifted in the direction of the line c-d, the workpiece 15 is conveyed in the direction c-d. However, if a selection is commanded in the operational direction of the motors M1-M4, for instance M1 and M4 move in one direction while M2 and M3 move in the opposite direction, it is possible after a workpiece 15 has been fed onto the table to cause a pivotable or rotational movement of the workpiece as indicated by the arrow 25 in FIG. 7.

Figure 7:
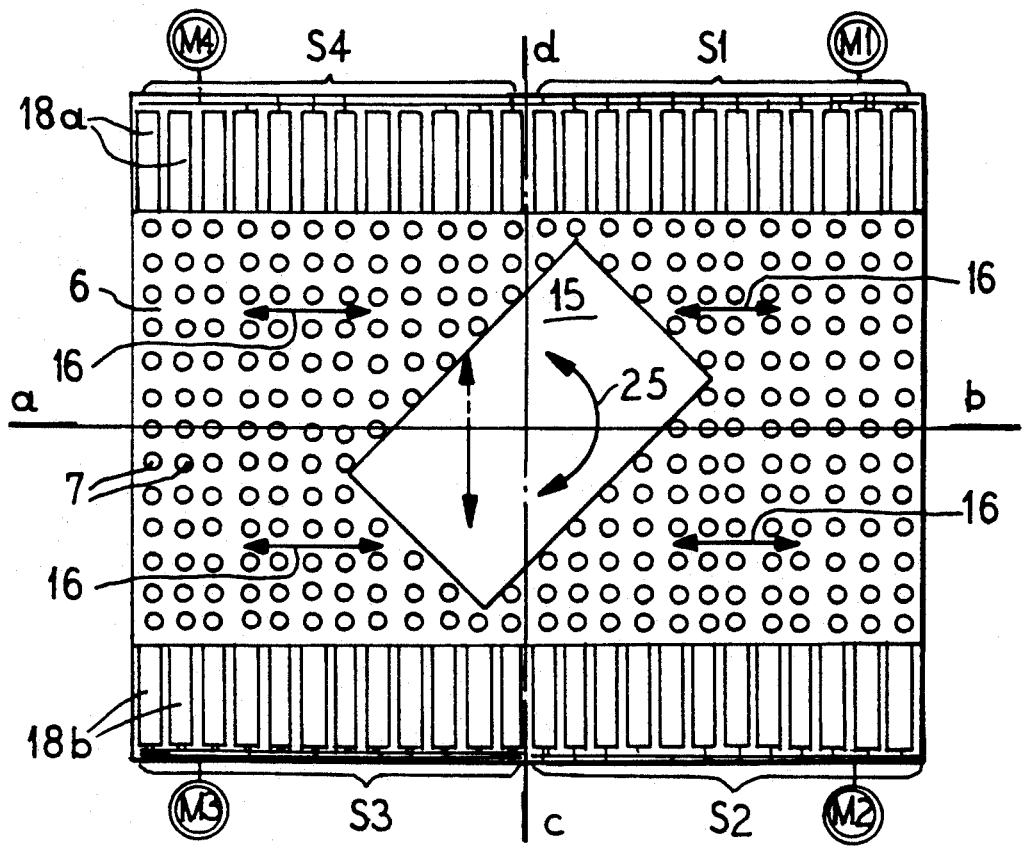
FIG. 7 is a top plan view of the modification of the embodiment of the table shown in FIGS. 4-6.
Figure 9:
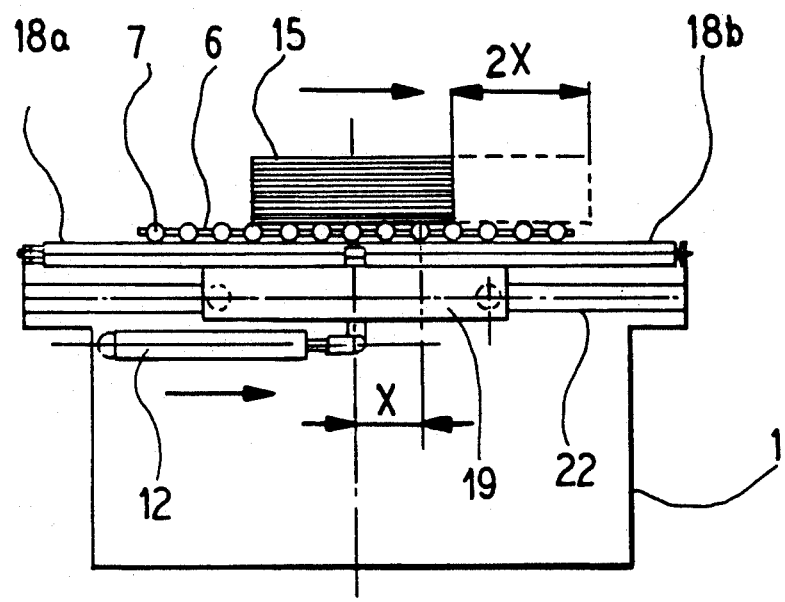
FIG. 9 is an end view taken from the left-hand side of the table shown in FIG. 8.

It is appropriate to use motors running with variable speeds or with or without previous programs. It should also be noted that the motors M1 and M4 do not have to be moving in opposite directions from the motors M2 and M3 to obtain the rotation but only at a different speed. The rotation of the workpiece as illustrated in FIGS. 7 by the arrow 25 can be accomplished without shifting the tray 6. As a rule, when the tray 6 is shifted along the axis c-d, all the sections S1 to S4 operate in the same direction and the functional disassociation of the various sections will occur only with the tray 6 at a standstill and the workpiece substantially centered on the various reference axes c-d and a-b.

The motion of the workpieces can be controlled for instance by photoelectric sensors which are not illustrated or else the device is acting so as to act on specific automation which is not represented and ensure the distribution of the workpieces in a joint action with the sidewise shift of the tray 6.

Notwithstanding the fact that the table with the four sections S1 to S4 has been described, the number of these sections can be smaller or greater than the above-described number. So, for instance, sections S1 and S2 can be replaced with a single section as can also the sections S3 and S4, all rollers 18 of the table being of equal shape as those represented in FIGS. 4-6.

On machines of large sizes, it is even possible to conceive every roller 18 in more than two positions arranged side by side so if need be a third independent central portion might be driven from underneath, for instance, by a tangential belt.

Figure 13:
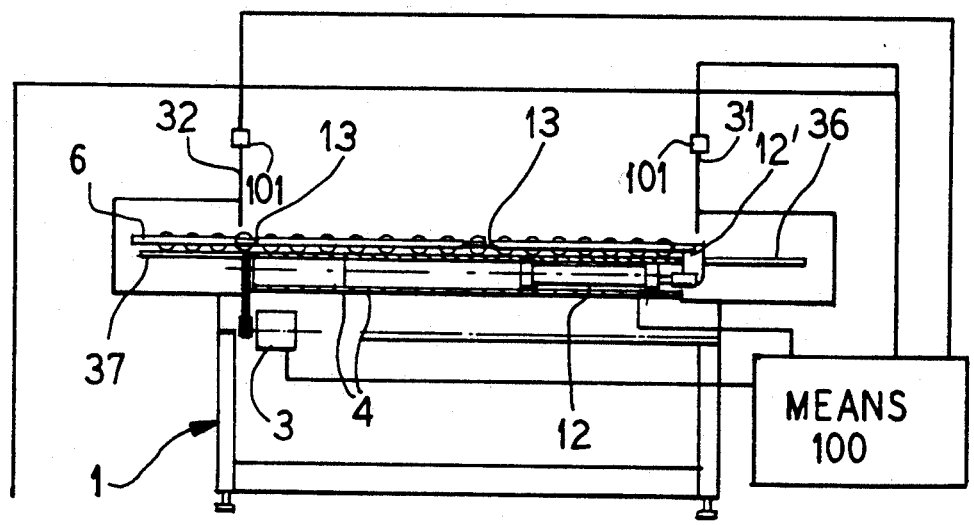
FIG. 13 is a cross-sectional view taken along lines XIII—XIII of FIG. 12.
Figure 14:
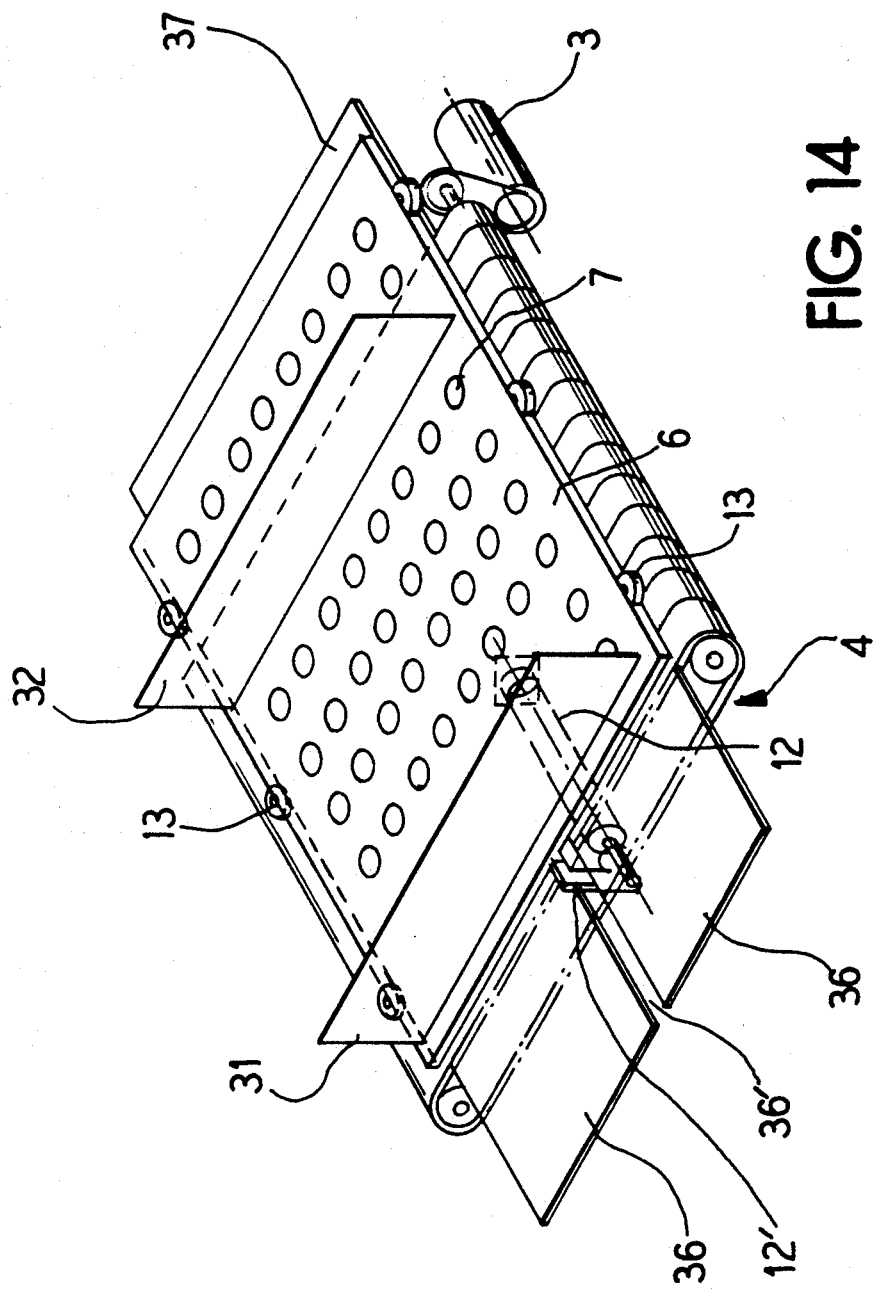
FIG. 14 is a top partial perspective view of the ball table of FIGS. 11-13.
Figure 15:
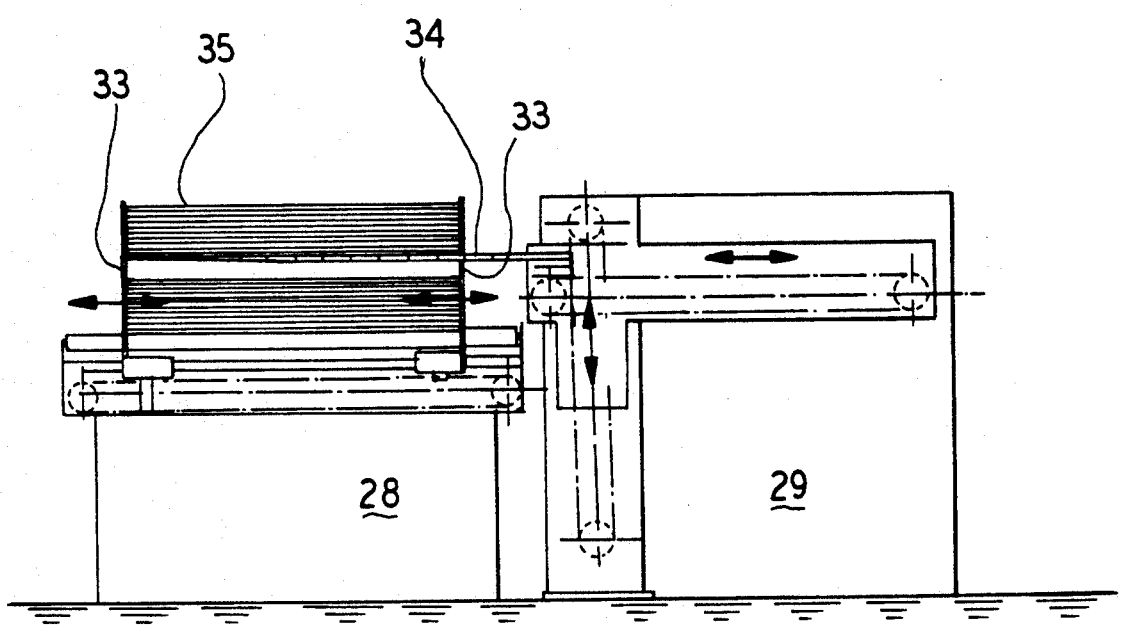
FIG. 15 is a cross-sectional view taken along line XV—XV of FIG. 12.

FIGS. 11-15 illustrate a table as specified by the present invention integrated into a device assembling adjacent multi-layer batches. Preferably, the table illustrated in FIG. 15 is a table of the type illustrated in FIGS. 1-3. This device includes the carrier ball operating sorting table 26 according to the invention, fed by a roller feed table 27 with batches to be processed. The sorting table 26 transmits the batches to an aligning table 28 acting jointly in sidewise direction with a system 29 ensuring the layerwise stacking of the batches. The elements of the table 26 structurally and functionally are identical to those of the table illustrated in FIGS. 1-3 and are identified by the same reference numbers. The batches are successively carried onto the tray 6 which, when it is at a standstill and when it is centered have the lengthwise axis situated in on extension of one of the feed tables 27.

Figure 11:
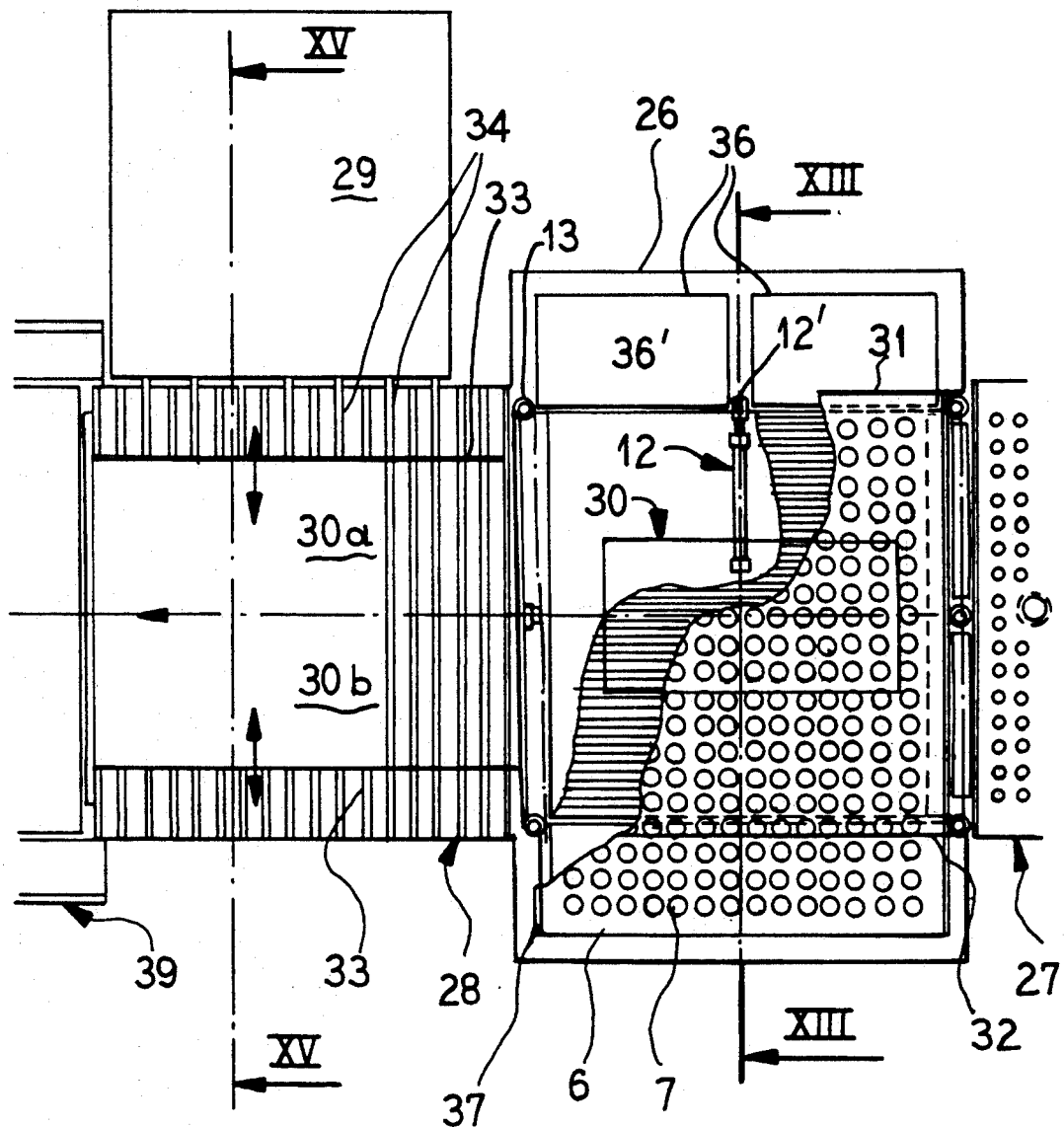
FIG. 11 is a top plan view with portions broken away for purposes of illustration of a stacking device for piling adjacent multi-layer batches and a table in accordance with the present invention.

The device is used, for instance, for arranging the batches side by side. To this aim with the table 6 being in the central position, a batch symbolically represented by 30 in FIG. 11 is carried to the center of the sorting table 26 by the belt 4 with the tray 6 remaining at a standstill. The proper positioning of the batch 30 is determined by photoelectric sensors 101 (FIG. 13) connected to the means 100 and supported by two lateral aligning plates 31 and 32, themselves arranged above the tray 6 and laterally with regard to the latter. Both plates 31 and 32 which were not illustrated in the tables of FIGS. 1-9 are fixed; however, the plates 31 and 32 have the possibility of being positioned with a required clearance so as to allow for sideways shifting of the tray 6. The plates 31 and 32 act as buffers for retaining the batches within the useful are a limited by the tables 27 and 28.

Once the batch 30 is at a standstill in the center of the tray 6, the tray is shifted sideways by the jack 12 towards the plate 31 or the plate 32. The jack 12 is horizontally arranged underneath the tray 6 in a central area between the upper and lower runs of the belt 4. The rod of the jack 12 is linked by a fixture 12' to one of the edges of the tray 6. In the course of the plate's shifting, the carrier balls 7 will push the batch 30 towards the respective plate 31 or 32 with twice the speed as the movement of the tray. With the batch aligned against the plate such as 31, the belt 4 is activated in order to transfer the batch onto the table 28.

The subsequent batch 30 will be aligned against the other plate such as 32 by the tray 6 in order to be transferred against the plate 33 while the two batches 30 will be aligned side by side between the plates 33 on the table 28 so as to be a layer of two batches 30a and 30b.

Figure 12:
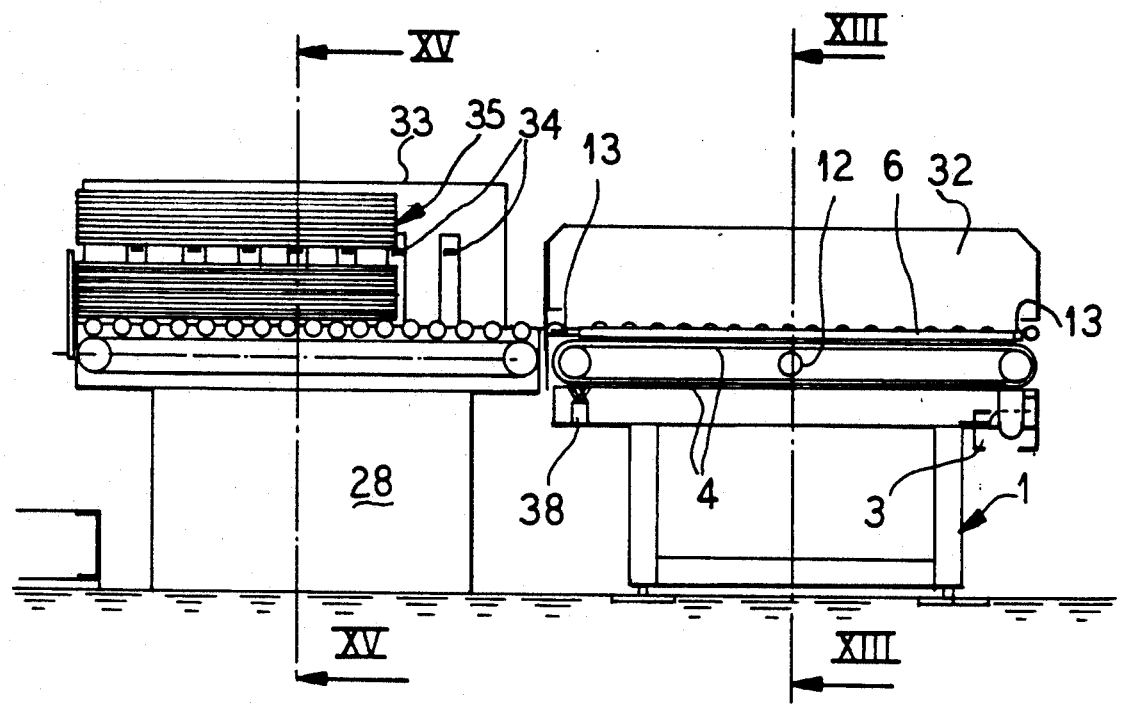
FIG. 12 is a front view of the stacking device and table of FIG. 11.

The device 29 with a fork 34 as illustrated in FIG. 12 is allowed to raise a layer 35 which is formed of two batches in order to make up a pile. For cutting the operation time involved, the aligning of every batch 30 on the table 26 is achieved by combining the motion of the batch along the lengthwise axis of the tray 6 with the crosswise motion of the tray 6 as soon as the batch 30 is sufficiently engaged on the tray 6 so as to have the batch move in a crab-like motion or diagonally towards either the plate 31 or the plate 32.

After a full removal of the batch 30 from the tray 6, the tray will then move back to its central position. The maximum offset movement of the tray 6 towards the plate 32 is represented in full lines in FIG. 11.

The belt 4 only covers the useful width corresponding to the distance between the plates 31 and 32. In addition, tray 6 and the carrier balls 7 are supported by fixed protruding support trays provided as extensions from the upper sides of the belt 4 and its support as best illustrated in FIG. 13. On the side of the jack 12 as illustrated in FIGS. 11 and 14, the support tray 36 will have a slot or recess 36' in its central area. The slot or recess will enable the passage of the fixture 12'. The support tray 37 which is on the opposite side does not have this recess or slot.

On the other hand, the belt 4 may be usefully provided with a cleansing device 38 or means for removing dirt or particles from the belt (FIG. 12) such as a brush, a scraper or other appropriate system.

The installation enables multi-layer stacking with various ways of reciprocally positioning of the batches of each layer with or without central apertures. If the installation upstream from the sorting table 26 does not allow the arrangement of the batches in accordance with the various positions, it is possible to use a sorting table of the kind represented by FIG. 7 and designed for ensuring the necessary alignments.

The stacks built up on the table 28 will then be removed onto a palletizing system 39.

Finally, the invention is of course not limited to the ways of realization represented and described above but covers nonetheless all alternatives, especially regarding the means for imparting to the carrier balls 7 at their point of contact with their support the rotary motion in the two perpendicular directions, as well as regarding the means for supporting, guiding and driving the movable tray 6.

I claim:

1. A table with crosswise operating motor-driven carrier balls designed for orthogonally sorting of flat workpieces, said table comprising a horizontal tray with freely rotatable carrier balls arranged within said tray so as to protrude from both upper and lower surfaces of the tray; means arranged underneath the tray for supporting said carrier balls; aligning plates being adjustably positioned above the tray to allow movement of the tray therebeneath; first means for imparting rotary motion in a first horizontal direction along a first line to the carrier balls being supported on said supporting means; second means for imparting to the carrier balls a second rotary motion in a second horizontal direction along a second line extending perpendicular to the first direction; means for controlling and checking the application and amplitude of said first and second rotary motions so as to impart to the carrier balls at contact points of the balls with the workpiece a rotary motion resulting from a variable amplitude in any direction of the reference plane defined by said first and second lines; means for carrying the workpieces onto the balls of the tray for processing; and means for collecting the workpieces at an outlet of the tray after processing.

2. A table according to claim 1, wherein the means for supporting the carrier balls consists of an endless belt, itself supported by appropriate support means, said first means consisting of the endless belt having an upper part in contact with the carrier balls as well as an arrangement for driving said belt in either direction along said first line, said second means being means for proving a relative motion at right angles to the motion of the belt between said belt and tray.

3. A table according to claim 2, wherein the means for generating rotary motion between the tray and belt consists of means for shifting the tray on the belt which moves on rollers each rotating on a fixed axle, and means for guiding movement of the tray along a direction along said second line.

4. A table according to claim 1, wherein the aligning plates extend above lateral edges of the first means used for driving the carrier balls, said first means having support trays along each side so that when the tray with the carrier balls is shifted sideways the first means protruding edge is supported on one of said support trays.

5. A table according to claim 1, wherein the first means is a belt and said table includes means for removing dirt and particles from said belt.

6. A table with crosswise operating motor-driven carrier balls designed for orthogonally sorting of flat workpieces, said table comprising a horizontal tray with freely rotatable carrier balls arranged within said tray so as to protrude from both upper and lower surfaces of the tray, means arranged underneath the tray for supporting said carrier balls; first means for imparting rotary motion in a first horizontal direction along a first line to the carrier balls being supported on said supporting means, said first means comprising a continuous belt being supported on support rollers and having means for driving the belt, second means for imparting to the carrier balls a second rotary motion in a second horizontal direction along a second line extending perpendicular to the first direction, said second means consisting of means of shifting the tray relative to the belt and including a fixed horizontal jack arranged between the upper and lower runs of the belt and linked to one edge of the tray, said belt having a width corresponding to the effective width of the movement for a batch on the table, said belt having an extension tray on each side with one of said extension trays adjacent the connection of the jack to the tray having a slot for receiving said connection, means for controlling and checking the application and amplitude of said first and second rotary motions so as to impart to the carrier balls at contact points of the balls with a workpiece a rotary motion resulting from a variable amplitude in any direction of the reference plane defined by said first and second lines, means for carrying the workpieces onto the balls of the tray for processing, and means for collecting the workpieces at an outlet of the tray after processing.

7. A table according to claim 6, which includes means for removing dirt and particles from said belt.

8. A table according to claim 6, which includes aligning plates being adjustably positioned above the tray to allow movement of the tray therebeneath.

9. A table according to claim 8, wherein the aligning plates extend above lateral edges of the belt used for driving the carrier balls.

* * * * *